United States Patent [19]

Adams

[11] 4,188,680
[45] Feb. 19, 1980

[54] METHOD FOR MANUFACTURING WATERPROOF BOOTS

[75] Inventor: Richard R. Adams, Bettendorf, Iowa

[73] Assignee: Chromalloy American Corporation, St. Louis, Mo.

[21] Appl. No.: 893,820

[22] Filed: Apr. 5, 1978

[51] Int. Cl.$^2$ ............................ A43D 9/00; A43B 1/10
[52] U.S. Cl. ........................................ 12/142 E; 36/4
[58] Field of Search ............... 12/1 R, 1 A, 142 R, 12/142 E, 142 EV; 36/4, 7.1

[56] References Cited

U.S. PATENT DOCUMENTS

| 2,617,208 | 11/1952 | Marx et al. | 12/142 EV |
| 3,416,174 | 12/1968 | Novitske | 12/142 E |
| 3,858,263 | 1/1975 | Smirnov et al. | 12/1 A |

Primary Examiner—Patrick D. Lawson
Attorney, Agent, or Firm—Strauch, Nolan, Neale, Nies & Kurz

[57] ABSTRACT

A method for manufacturing boots of rubber or the like wherein the successive boot building operations are carried out on lasts carried by a movable conveyor indexed to and through stations spaced along a line. An elastic sock is mounted on each last at the first station, an adhesive or a chemical reactant such as a coagulant solution are applied to the sock, latex dip coatings are applied, and binding, foxing, toe caps, insulation and the like applied before vulcanization and final lacquer spraying and trimming at indexed stations.

7 Claims, 6 Drawing Figures

METHOD FOR MANUFACTURING WATERPROOF BOOTS

This invention relates to the manufacture of waterproof rubber boots and the like and particularly to novel methods and apparatus whereby even relatively heavy duty waterproof boots such as firefighter's boots may be fabricated rapidly and efficiently in continual steps.

The conventional manner of making rubber boots includes mainly the manual assembly of precut and rubberized parts fitted in sequence upon a fixed last and vulcanized. This requires considerable preparation time and careful manual assembly, with attendant costs due to the time and labor involved.

In the invention various boot building operations are carried out in novel sequence on spaced lasts carried by a continually moving conveyor line through discrete stations whereby each boot is sequentially constructed to emerge in finished condition at the end of the line, and this is the major object of the invention.

A further object of the invention is to provide a novel method of and apparatus for manufacturing rubber boots wherein each boot structure remains from beginning to finished condition upon the same last mounted on a conveyor that is controllably moved and indexed at a sequence of boot-building stations, with a reduction of the manual labor and time involved in conventional boot making.

Pursuant to this object an adhesive or chemical reactant treated elastic form fitting sock mounted on the last and moved through successive stations where one or more coatings of latex are applied by dipping the last in tanks containing the latex, the latex is cured, elements such as binding strips, foxing, toe caps, insulation, reinforcements, outsoles and heels are applied, the entire assembly vulcanized in a special hot dip to unitary condition and then given a final external lacquer spray before timing and removal from the last.

PREFERRED EMBODIMENTS

Figure 1:
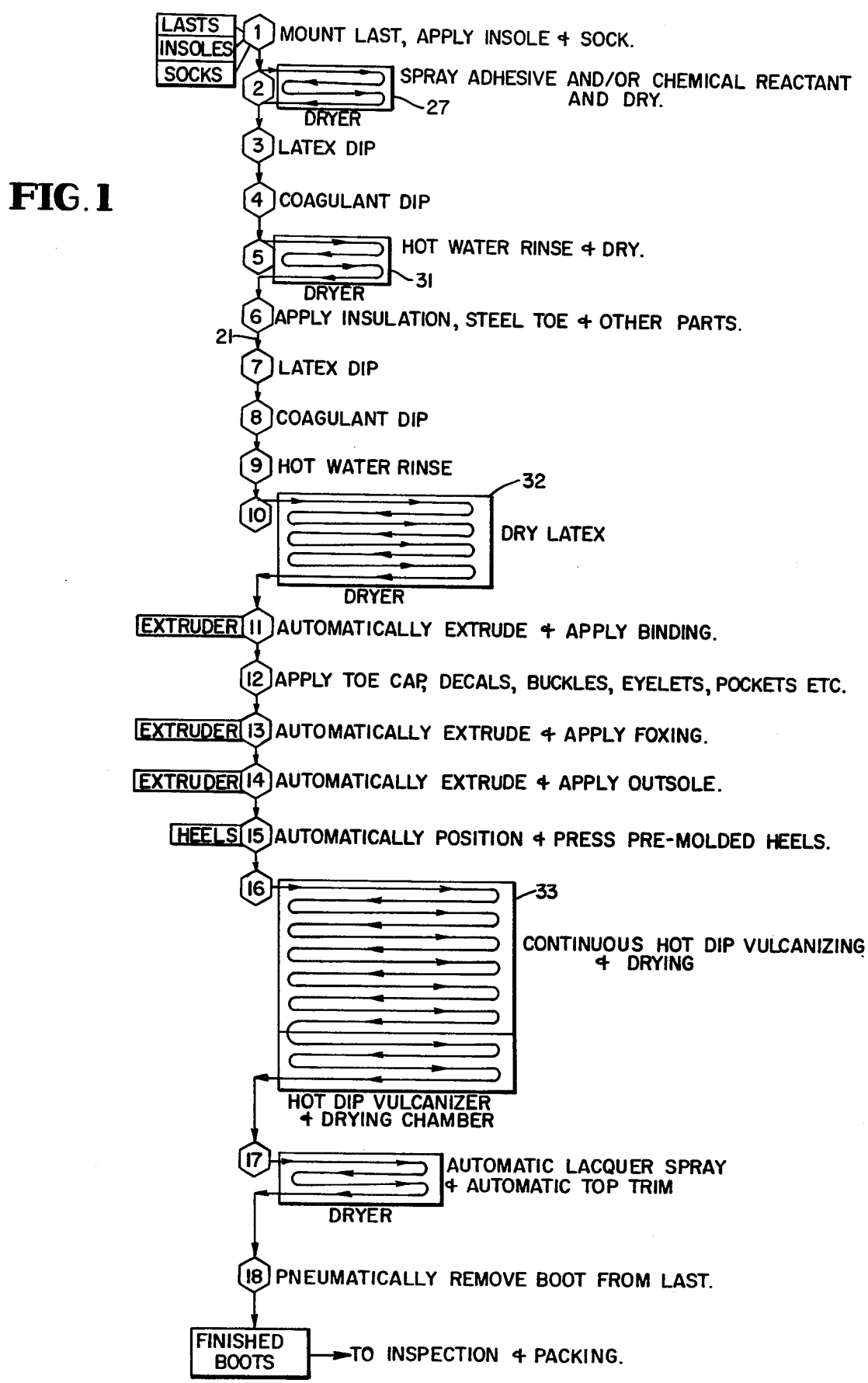
FIG. 1 is a diagramatic view showing the novel system of the invention.

FIG. 1 is essentially a flow sheet illustrating the continual sequence of the invention, wherein various operational stations incident to boot building are number 1–18. In FIG. 1 the line marked 21 identifies a conveyor shown for explanation as linear but which in practice may be endless with station 18 located near station 1.

In the invention a spaced series of rigid usually metal lasts 22 each having a contour and smooth exterior surface simulating the interior surface of the boot to be fabricated are suspended from the conveyor 21 for movement in sequence between and through the stations. These lasts are preferably substantially equally spaced along the conveyor. Each last (FIG. 1a) consists essentially of an upper leg portion 23 and a lower foot portion 24 intersecting at the heel end 25 of the foot portion.

Figure 1A:
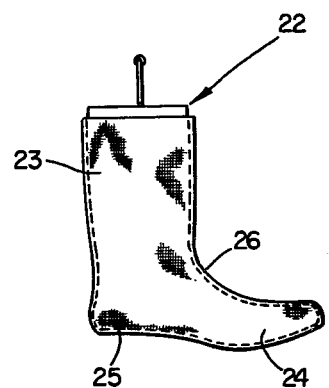
FIG. 1a is a diagramatic view showing the sock on its last.

At station 1 a worker applies a dry elastic sock 26 upon the last positioned there. The sock may preferably be made of a conventional elasticized four way stretch or equivalent fabric and its size is such that it will fit snugly with all of the surface contours of the last it covers. As shown in FIG. 1a, the sock 26 preferably terminates just below the top of the leg portion of the last.

An insole may be mounted on the bottom of the last to be enclosed by the mounted sock.

This sock 26 will be the inner lining of the finished boot.

At station 2 a suitable adhesive or chemical reactant preferably in the form of a coagulant solution is applied to the outer surface of the sock and this is dried or allowed to dry. The coagulant solution may be a solution of formic acid in ethanol and water. As shown the conveyor here may be routed off the direct path to pass through a spray and dry cabinet indicated at 27 wherein any suitable form of spray nozzles may be arranged to discharge liquid adhesive or chemical reactant over the entire surface of the sock, and then hot air blast devices ensure drying of the adhesive before the last returns to the path of line 21.

At this point the dried adhesive or chemical reactant essentially forms a partly penetrating flexible outer coat on the sock fabric. Preferably the coating does not penetrate to the inner surface of the sock. This coating impregnated in the sock is such that it will combine and/or bond substantially integrally with the rubber latex layer applied at the next station.

At station 3 the last descends to be partly immersed in a bath of liquid latex maintained at a suitable temperature and then raised back onto the line. This is diagramatically illustrated in FIG. 1b wherein the tank 28 contains liquid latex automatically maintained at a given level 29 whereby substantially the entire outer surface of the sock is coated with a thin layer of rubber. The latex coat is indicated at 30 in FIG. 1c. This operation can be accomplished by suitably inclining the conveyor downwardly and then upwardly, or the last may be lowered and raised relative to the conveyor by hydraulic or electrical units on the conveyor.

Figure 1B:
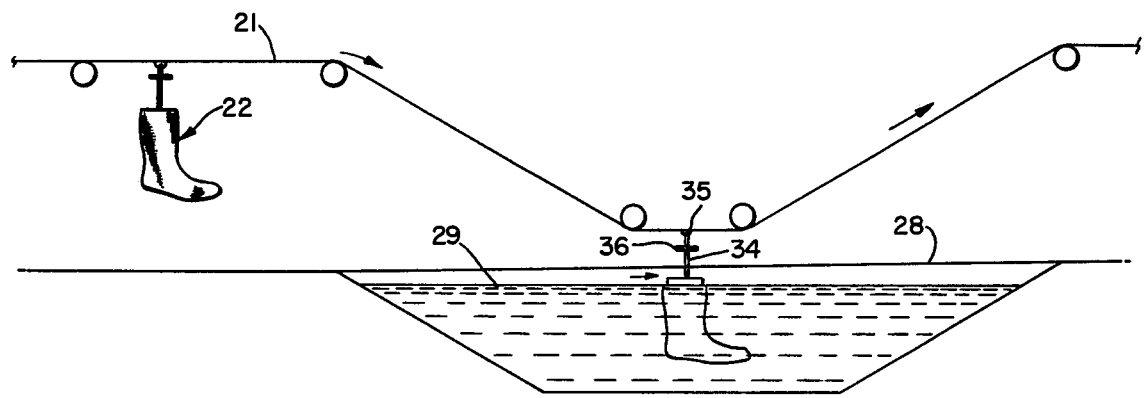
FIG. 1b is a diagramatic view illustrating a dipping step for applying a latex coating.
Figure 1C:
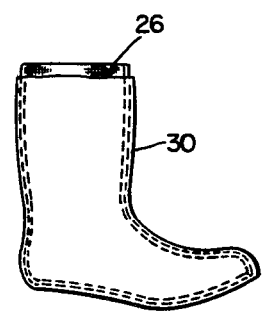
FIG. 1c is a diagramatic view showing a latex coated sock on its last.

Now the last is moved to station 4 where the conveyor again descends to dip it into a coagulant bath where the layer 30 of rubber latex is set. This operation may consist of passing the last through a tank such as shown in FIG. 1b but containing a coagulant, preferably maintained a level just below the latex level of tank 28.

Upon return to the line at station 5 the conveyor 21 diverts with the last laterally into a rinse and dry cabinet 31 wherein hot water and hot air blasts are directed onto the latex coated sock, whereby the rubber latex coating is dried.

At this point the last carries the sock coated with the adhesive or chemical reactant and overcoated with dried latex. If thicker coats of latex are desired the operations of stations 4 and 5 may be repeated in sequence at this point along the line.

Now the conveyor 21 moves the last to station 6 where an operator may manually apply external insulation and if desired steel toe caps and other parts over the dry latex layer or layers. The insulation is preferably in the form of strips or sheets of foam rubber or other suitable insulating material. Usually adhesive is applied to hold the insulation and toe cap in place temporarily.

Then the conveyor 21 moves the last in succession through a latex dip station 7, a coagulant dip station 8, a hot water rinse dip station 9 and off the line through an extensive cabinet 32 at drying station 10 so that the further coating of rubber latex acquired at station 7 which is preferably thicker than that acquired at station 3 and which permanently encloses the insulation and the toe cap is dried and emerges with excess water and volatile solvents removed. As was the case at stations 4 and 5 the operations at stations 7, 8, 9 and 10 may be repeated in sequence to build up this latex layer to desired thickness. In some forms of the invention the insulation and/or toe cap and/or other parts may be omitted, in which case stations 7, 8 and 9 may be omitted or rearranged or may provide a second latex coat overlying that applied at station 3.

Now the conveyor moves the last to station 11 where a binding is applied around the upper leg portion of the boot. This is a rubber strip encircling the boot and may be automatically applied directly to the boot while the strip is extruded. The binding strip is applied just below the top level of the coagulant dip line.

Now conveyor 21 moves the last into station 12 where outer top caps, decals, buckles, eyelets, pockets and the like may be attached to the leg portion of the boot. This is a more or less conventional manual operation unique in that the last remains on the conveyor.

Conveyor 21 now moves the last to station 13 where foxing is applied all around the lower edge of the foot portion. While this operation may be manual, it may be accomplished automatically by extruding the foxing strip and applying it directly to the boot similarly to the binding strip.

The last is now moved to station 14 where the outsole is applied to the bottom. Again this may be done manually but may be accomplished automatically by extruding the outsole material and affixing it to the previously formed assembly.

Similarly the last is moved to station 15 where premolded heels are attached to the bottom of the outsole. This may be manual but apparatus may be provided whereby the premolded heels are fed into position at the line, adhesively coated and pressed onto the heel portion of each outsole at this station.

At station 16 the last containing the substantially complete boot is diverted to pass through a continuous hot dip solution in a cabinet or enclosure 33 where all of the rubber on the last is vulcanized or permanently cured. This includes dipping the last into a molten salt solution maintained at about 300° F.–450° F. and then exposing it to blasts of hot air so that the boot emerges dry where it leaves station 16 and reenters the line.

At station 17 the boot is automatically trimmed, that is the boot material above the binding strip is cut off and discarded, and the entire outer surface is finally sprayed with a quick drying protective and decorative urethane lacquer over its entire external surface.

At station 18 the finished boot is removed from the last, usually through an internal air blast from the last.

The boots are now ready for pairing, inspection and packaging.

FIG. 1b at the right side illustrates the manner the last is suspended from the conveyor and adapted for automatic application of the binding strip. A relatively rigid support member such as a rod 34 is fixed at its lower end to the last and at its upper end has a universal connection 35 with the conveyor enabling the suspended last to rotate about a vertical axis. Rotation of the last at station 11 is accomplished as by engagement of a fixed spur gear 36 on support 34 engaging on stationary horizontal rack section suitably located at station 11, so that as the conveyor moves from left and right in FIG. 1b engagement of the gear 36 with the rack section will rotate the last one complete revolution.

At station 11, rubber in strip form is extruded from a Banbury mixing device or the like, and this strip (40 in FIG. 2) is patterned on its outer surface by a suitable pattern roll and adhesively coated on its inner side and delivered as a horizontal conveyor belt system with its patterned surface 42 external to be affixed to the boot structure on the rotating last.

At station 13 the same type of means may be applied to rotate the last while extruding and applying the foxing strip.

Figure 2:
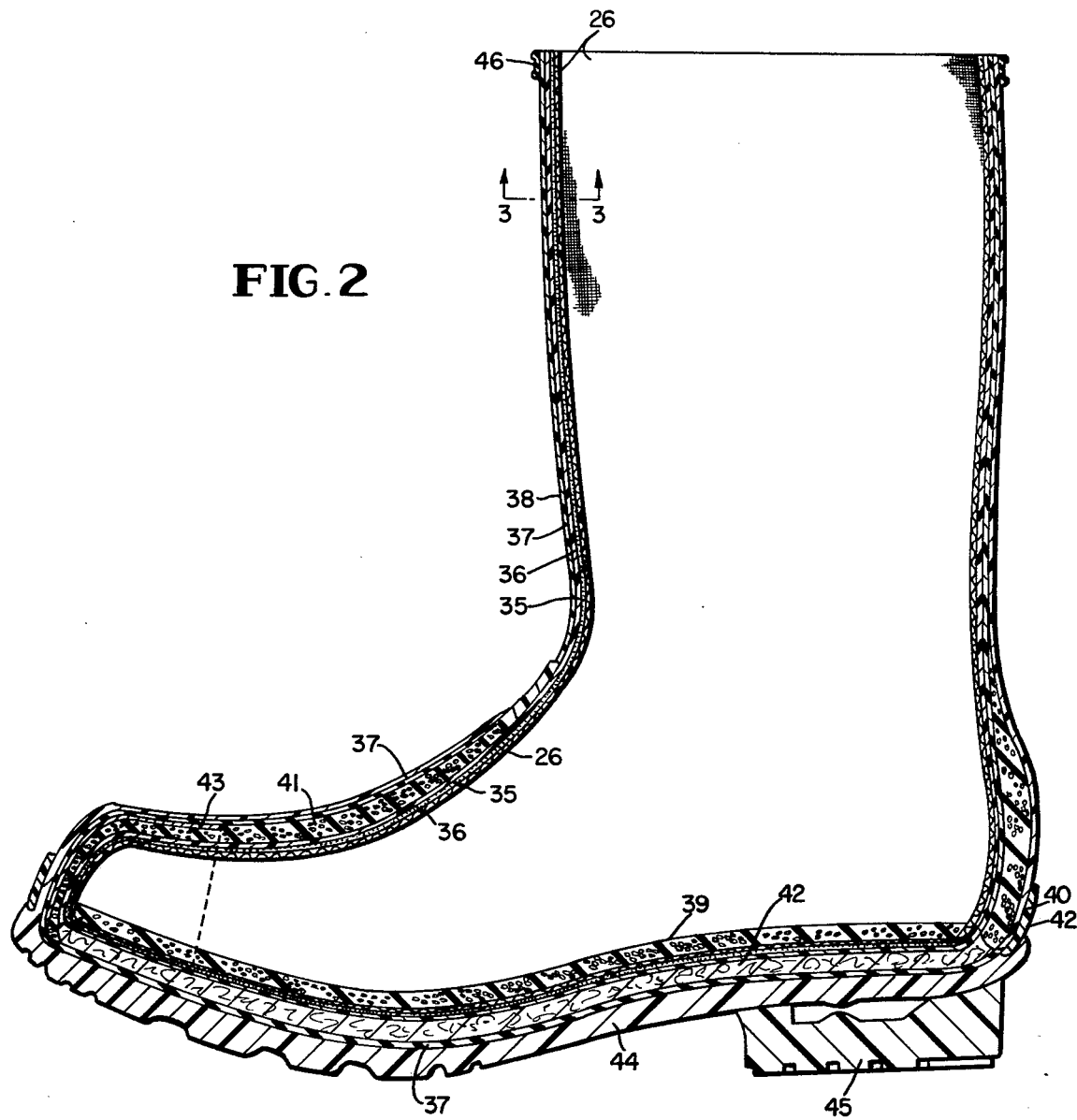
FIG. 2 is a section showing a finished boot structure.
Figure 3:
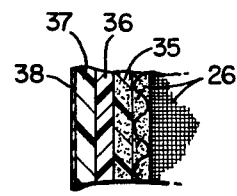
FIG. 3 is a fragmentary enlarged section on line 3—3 of FIG. 2.

FIG. 2 shows a finished boot of the invention comprising the inner lining in the form of sock 26, the adhesive or chemical reactant layer 35 shown of exaggerated thickness and in enlarged FIG. 3 as partially penetrating the sock, latex layers 36 and 37 and the outer urethane lacquer coating 38 applied at station 17. An insole 39 is mounted within the bottom of the sock. Insulation strips 41 and 42 are enclosed by the latex layers, and an enclosed steel toe cap is shown at 43. The applied foxing strip is shown at 40. The outsole 44 underlies the latex layer 37 along the bottom of the boot and on it is mounted the heel 45. The binding strip 46 encircles the latex layer 37 at the upper open end of the boot.

The invention may be embodied in other specific forms without departing from the spirit or essential characteristics thereof. The present embodiments are therefore to be considered in all respects as illustrative and not restictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A continual method of making waterproof footwear comprising the steps of:
   (a) mounting an elastic fabric sock that is to be the inner lining of said footwear upon a shaped last, said sock having a foot portion and an upper portion;
   (b) coating said sock with a coagulant capable of effecting bonding with liquid rubber;
   (c) applying liquid rubber to form one or more external coatings thereof over the sock by dipping the last into liquid latex and curing said rubber;
   (d) conveying the last carrying the rubber coated article to successive stations where:
       (1) a binding is attached around the upper portion of said rubber coated article;
       (2) toe caps and other formations and/or devices individual to the type of footwear being made are mounted on the rubber coated article; and
       (3) foxing, outsole and heel elements are attached over the rubber coating at the foot portion of the rubber coated article;
   (e) then conveying the last containing the foregoing to a hot liquid bath station for vulcanizing in final assembly;
   (f) trimming and finishing the assembly; and then
   (g) removing the article from the last.

2. In the method defined in claim 1, said last being mounted on a conveyor and said conveyor being actuated to position the last at the successive stations.

3. In the method defined in claim 1, the step of applying insulation between successive coatings of liquid rubber at least at said foot portion.

4. The method defined in claim 1, wherein said vulcanization step is carried out by immersing the last containing the partially complete footwear in a hot liquid dip bath maintained at about 300° F.–450° F. and then drying the same.

5. The method defined in claim 1, wherein after vulcanization an external finish coating of lacquer is applied over the entire article.

6. A continual method of making waterproof footwear comprising the steps of:
- (a) mounting an elastic fabric sock that is to be the inner lining of said footwear upon a shaped last carried by a conveyor, said sock having a foot portion and an upper portion;
- (b) diverting the conveyor to pass the last through a container of liquid rubber for applying liquid rubber to form one or more external coatings thereof over the sock and curing said rubber;
- (c) conveying the last carrying the rubber coated article to successive stations where:
  - (1) a binding is attached around the upper portion of said article;
  - (2) toe caps and other formations and/or devices individual to the type of footwear being made are mounted on the rubber coated article; and
  - (3) foxing, outsole and heel elements are attached over the rubber coating at the foot portion of the rubber coated article;
- (d) then conveying the last containing the foregoing to a hot liquid bath station for vulcanizing in final assembly;
- (e) trimming and finishing the assembly; and
- (f) removing the article from the last.

7. A continual method of making waterproof footwear comprising the steps of:
- (a) mounting an elastic fabric sock that is to be the inner lining of said footwear upon a shaped last carried by a conveyor, said sock having a foot portion and an upper portion;
- (b) applying liquid rubber to form one or more external coatings thereof over the sock, the step of applying each rubber coating comprising the steps of:
  - (1) moving the conveyor to dip the last in a container of liquid latex;
  - (2) moving the container to a station to dip the latex coated article in a coagulant bath;
  - (3) moving the conveyor to a station for rinsing the coated article; and then
  - (4) moving the conveyor to a station for drying the coating, and curing said rubber;
- (c) conveying the last carrying the rubber coated article to successive stations where:
  - (b 1) a binding is attached around the upper portion of said article;
  - (2) toe caps and other formations and/or devices individual to the type of footwear being made are mounted on the rubber coated article; and
  - (3) foxing, outsole and heel elements are attached over the rubber coating at the foot portion of the rubber coated article;
- (d) then conveying the last containing the foregoing to a hot liquid bath station for vulcanizing in final assembly;
- (e) trimming and finishing the assembly; and
- (f) removing the article from the last.

* * * * *